No. 645,193. Patented Mar. 13, 1900.
A. SIMMONS.
CUSHION HORSESHOE.
(Application filed June 3, 1899.)
(No Model.)
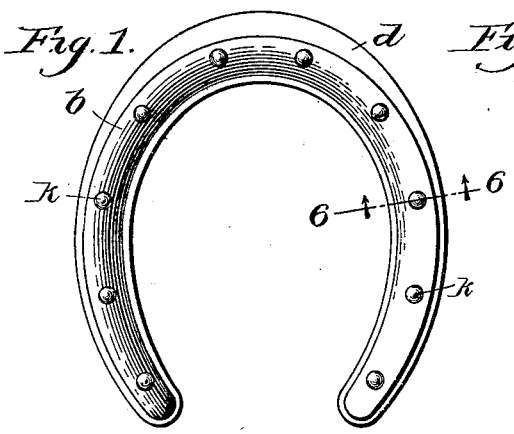
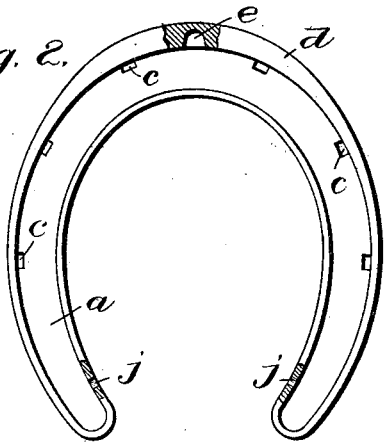
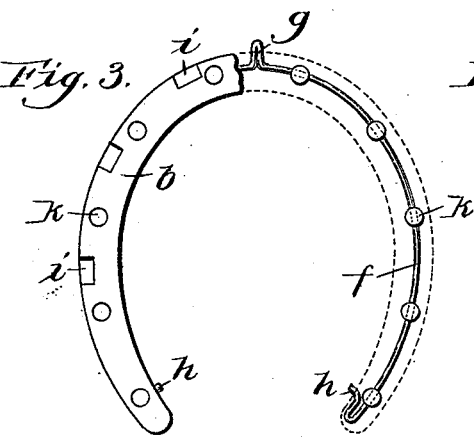
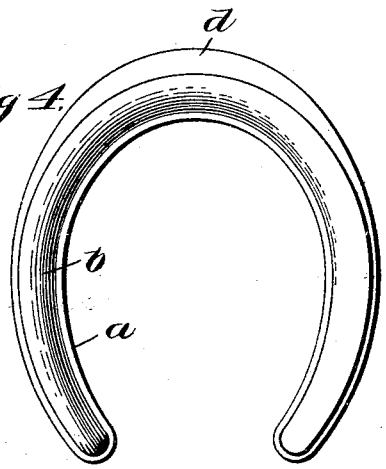
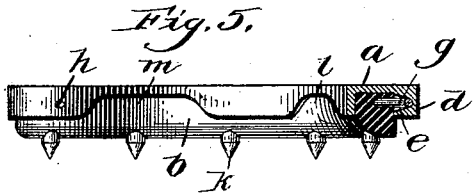
WITNESSES:
Charles F. Logan
Annie J. Dailey
INVENTOR.
Allen Simmons.
BY Crossley & Goddard
ATTORNEYS.

UNITED STATES PATENT OFFICE.

ALLEN SIMMONS, OF BOSTON, MASSACHUSETTS.

CUSHION-HORSESHOE.

SPECIFICATION forming part of Letters Patent No. 645,193, dated March 13, 1900.

Application filed June 3, 1899. Serial No. 719,204. (No model.)

*To all whom it may concern:*

Be it known that I, ALLEN SIMMONS, of Boston, (Roxbury,) in the county of Suffolk and State of Massachusetts, have invented certain new and useful Improvements in Cushion-Horseshoes, of which the following is a description sufficiently full, clear, and exact to enable those skilled in the art to which it appertains or with which it is most nearly connected to make and use the same.

This invention has relation particularly to cushion-horseshoes and shoes adapted for use on gentlemen's driving-horses and the like, though its use is not intended to be limited by this specification.

It is the object of this invention to provide a cushion-horseshoe which shall be serviceable in the highest degree not only as to its cushioning properties, but in respect to the ordinary functions performed by horseshoes as well.

It is the particular purpose of the invention to effect lightness in weight, readiness and security of attachment, and such structural characteristics as will surely obviate any harmful results from the cumulative "poundings" of a horse's foot upon hard pavements or roadways.

To these ends the invention consists of a recessed shell or base-plate provided with nail-holes, adapting it to be nailed to the foot of a horse, and a tread composed of caoutchouc or rubber constructed to fit in the recess of the base-plate and having a wire or equivalent means cast therein, which wire is provided with features which are adapted to engage or coöperate with features with which the base-plate or shell is provided in order to hold the tread in place, as is hereinafter described.

The invention also consists of a horseshoe having all or part of the structural characteristics before mentioned combined with novel means for roughing the shoe to give the horse a foothold on ice or frozen or on otherwise slippery ground.

The invention also consists of other improvements incidental to the foregoing, all as I will now proceed to describe in detail, and point out with particularity in the appended claims.

Reference is to be had to the annexed drawings, and to the letters of reference marked thereon, forming a part of this specification, the same letters designating the same parts or features, as the case may be, wherever they occur.

Of the drawings, Figure 1 is an inverted plan view of one form of my invention complete, the shoe being represented as roughed. Fig. 2 is an inverted plan view of the base-plate or shell of the shoe shown in Fig. 1, portions being represented in section. Fig. 3 is a plan view of the rubber tread shown in Fig. 1, one-half being shown as broken away with a dotted outline. Fig. 4 is an inverted plan view of a horseshoe somewhat similar to Fig. 1 embodying my improvements, the shoe being smooth or not roughed. Fig. 5 is a sectional side elevation of a roughed shoe slightly modified in form from that shown in Fig. 1, the section being taken through the center of the toe of the shoe. Fig. 6 is a sectional detail view taken on the line 6 6 of Fig. 1.

In the drawings, $a$ designates the base-plate, which consists of a piece of metal horseshoe-shaped, with flanges on its edges, forming a kind of shell for the reception of the tread $b$, which is formed to fit snugly between the flanges of the base-plate. The latter is provided at suitable intervals with holes $c$ for the shanks of nails, by which the shoe is secured to the foot of the horse.

At the toe $d$ of the base-plate the outer flange may be thickened, (though this is not essential,) and a recess or socket $e$ may be formed in this thickened part for a purpose to be presently explained.

The tread is made of caoutchouc or india-rubber or similar material and has a wire $f$, of steel or equivalent material, cast in it, the said wire being formed at the toe-point with a projecting bend $g$ and at the end of a return-bend at the heels with an angular projection $h$. The tread will also be cast with recesses $i$ in its upper side for the reception of the nail-heads, by which the shoe is secured to the foot of the horse. Under these circumstances the tread may be secured to the base-plate by inserting the projection $g$ of the wire in the recess $e$ and springing the sides of the tread into place between the flanges, the projections $h$ at the heels extending into holes $j$ in the inner flange, the said projections serving to hold the shoe locked in place.

To form a rough shoe, I string, as it were, sharpened pins $k$ on the wire $f$ before casting, arranging the pins at desired intervals with their upper ends resting against the lower surface of the base-plate and so that their sharpened ends will protrude to a proper extent, as is perhaps best shown in Figs. 5 and 6. Any other manner, however, of holding the roughing-pins in place will subserve the purposes of my invention.

The plate $a$ need not necessarily be thickened to the degree shown, or, for that matter, need not be thickened at all, since the projection $g$ may be made to project into a hole formed through the flange of the plate at the toe.

In some instances I prefer to cut away the inside flange at a point $l$ between the toe and the central parts of the quarters and at $m$ between the central parts of the quarters and the heel to lighten the plate. These and other modifications may be made in the form of the parts without departing from the nature or spirit of the invention.

A horseshoe constructed as described subserves all of the purposes of the ordinary shoe and besides provides a light cushion-shoe which obviates injury produced by cumulative shocks and hammerings incident to the use of rigid shoes.

My improved shoe is specially adapted to use on "light-driving" horses, and when one tread becomes worn it can readily be replaced by a new one, or a smooth tread can in like manner be replaced by a roughed one, and vice versa.

Having thus explained the nature of the invention and described a way of constructing and using the same, though without attempting to set forth all of the forms in which it may be made or all of the modes of its use, it is declared that what is claimed is—

1. A horseshoe embodying in its construction a recessed base-plate adapted to be nailed to the foot of a horse, and provided at the heel with holes in the inner confronting walls of the recess, and a tread filling the recess of the bed-plate and composed of yielding material having a wire incorporated therein, with projections at the heel engaging the holes in the inner walls of the recess.

2. A horseshoe comprising a recessed base-plate, a tread of yielding material occupying the recess, a wire incorporated in said yielding material and engaging the base-plate to secure the tread, and pins in the nature of calks engaged with said wire and protruding from the tread, substantially as described.

3. A horseshoe embodying in its construction a recessed base-plate adapted to be nailed to the foot of a horse, and a tread composed of yielding material having a wire incorporated therein provided with projections adapted to extend into recesses formed in the base-plate, combined with pins connected with the said wire and extending through the tread, substantially as described.

In testimony whereof I have signed my name to this specification, in the presence of two subscribing witnesses, this 15th day of May, A. D. 1899.

ALLEN SIMMONS.

Witnesses:
 ARTHUR W. CROSSLEY,
 ANNIE J. DAILEY.